May 23, 1944. A. P. CRAIG 2,349,538
HOSE CLAMP
Filed Dec. 28, 1942
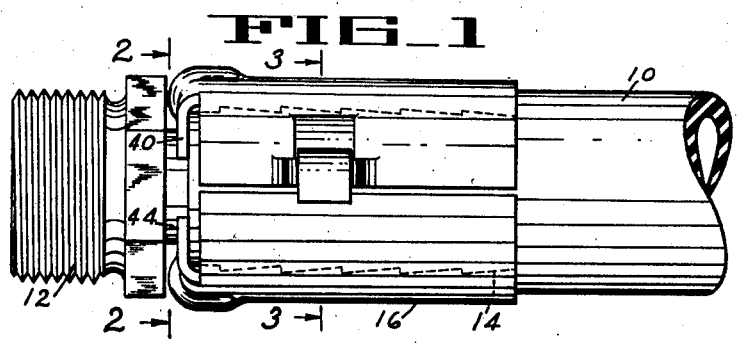
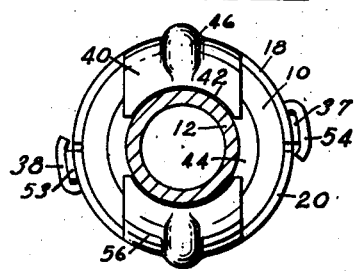
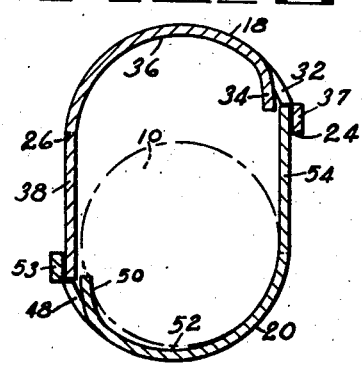
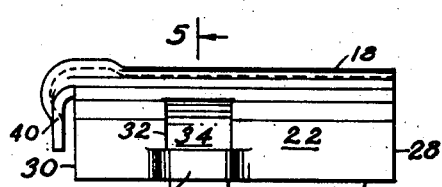
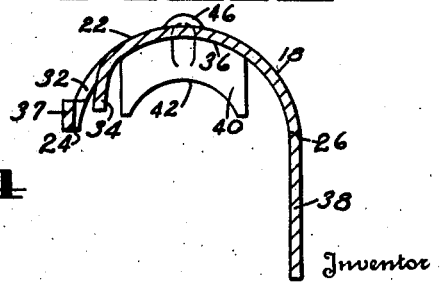
Inventor
ALBERT P. CRAIG
By Philip A. Minnis
Attorney Patented May 23, 1944

2,349,538

UNITED STATES PATENT OFFICE 2,349,538

HOSE CLAMP

Albert P. Craig, Morgan Hill, Calif., assignor to Food Machinery Corporation, San Jose, Calif., a corporation of Delaware Application December 28, 1942, Serial No. 470,395

3 Claims. (Cl. 285—77)

This invention relates to hose clamps, and more especially to improvements in hose clamps for high pressure hose lines.

Hose clamps are commonly employed for fastening rubber or the like hose lines to connections for spray nozzles and pumps and for preventing the connections from being forced out of the hose under pressure. Although numerous clamp structures have been suggested for such use, those of a desirable character have frequently been so bulky as to interfere with the freedom of the operator in handling the spray nozzles and have also been impossible of use where little space was available to make a connection. Moreover, many clamps have been awkward to assemble or have required special tools for their application.

It is therefore the general object of my invention to provide a simple, compact, efficient hose clamp for applications of the foregoing character that is easily and quickly assembled and that requires no special tools for its application.

Another object is to provide an inexpensive hose clamp that may be stamped from sheet metal.

Other objects and advantages of my invention will become more apparent from the following description taken in connection with the accompanying drawing wherein:

Fig. 1 is a side view of a hose and fitting to which the clamp of my invention has been secured;

Fig. 2 is a section taken as indicated by the arrows 2—2 in Fig. 1;

Fig. 3 is a section taken as indicated by the arrows 3—3 in Fig. 1, but showing the positions of the parts during assembly of the clamp to the hose;

Fig. 4 is a side elevation of the clamp of my invention showing the two parts thereof apart or separated; and Fig. 5 is a section taken through one of the parts of the clamp as indicated by the arrows 5—5 in Fig. 4.

Referring to the drawing in which similar numerals refer to similar parts in the several views, 10 represents a hose, for instance a high pressure hose of rubber and fibre construction, to the end of which is connected a fixture or fitting 12, for attachment to a spray nozzle or pump. The fixture has a corrugated neck portion 14, over which the hose is mounted and a clamp generally designated by the numeral 16, securely holds the hose to the fitting, and, moreover, prevents the fitting from being forced out of the hose under pressure of fluid carried in the hose.

The clamp 16, preferably consists, as shown in Figs. 3, 4 and 5, of two sections or parts 18 and 20 respectively, which may be of identical construction. The section 18 has a relatively rigid but deformable body portion 22 of substantially semi-cylindrical shape, provided with substantially parallel, longitudinally extending edges or edge faces 24 and 26, and with substantially parallel end edges or edge faces 28 and 30, which follow the contour of the cylindric shape of the body.

Formed in the interior of the body 22 near its longitudinal edge 24, and spaced from the end edges 28 and 30 is an aperture or recess 32 (Fig. 3) preferably of rectangular shape and having its peripheral edges substantially paralleling the edges of the body portion 22. Projecting from the edge portion of the aperture 32 remote from the edge 24 of the body is a relatively rigid but deformable lug 34 substantially of the same size and shape as the aperture 32. As seen in Fig. 5, this lug extends in a direction inwardly of the body 22 so that it also in effect projects from the inner face 36 of the body. Preferably, the lug 34 subtends an acute angle with the inner face of the body 22. As shown in Figs. 4 and 5 the connecting web 37 of the body 22 between the edge 24 and aperture 32 is pressed or offset outwardly of the body to increase the extent of the aperture 32 between the web 37 and the lug 34. The body 22 is further provided with a relatively rigid but deformable elongated flat tongue 38 that preferably projects from the edge 26 of the body and is positioned along said edge directly opposite the lug 34. The tongue is slightly narrower than the aperture 32 so that it may enter the aperture of a similar section to interlock with the same as hereinafter explained. Preferably, the tongue 38 extends from the body 22 in the same direction as the lug 34 and substantially parallels the lug 34.

The body 22, furthermore, has a substantially rigid lip 40 (Figs. 4 and 5) extending from the end edge 30 of the body and substantially normal to the inner face 36 of the body. As shown in Figure 5, the lip 40 is formed with a semi-circular marginal portion 42 for engaging a shoulder or recess 44 of the hose fixture 12. A raised rib 46 is formed on the outer face of the lip 40 to reinforce and rigidify this portion of the clamp.

It will be understood that while the section 18 may be made in any suitable manner, it preferably is punched from a relatively heavy gauge sheet metal and stamped or otherwise preformed into the described shape. In such case, the lug 34 will be made in forming the aperture 32, and the reinforcing rib 46 will be formed by pressing outwardly a portion of the inner face of the lip 40.

As previously mentioned, the section or part 20 is preferably of identical construction to that of the section 18 and no separate description of the section 20 is therefore believed necessary. However, for the purpose of facilitating the further description, it may be said that the section 20 has an aperture 48, a lug 50, an inner face 52, a web 53, a tongue 54 and a lip 56 corresponding to the respective similar parts 32, 34, 36, 37, 38 and 40 of the section 18.

As shown in Fig. 3, the sections 18 and 20 of the clamp may be placed in clamping position about the hose 10 by positioning the hose against the face 52 of, for instance, the section 20 of the clamp and with the lip 56 of such section engaging the shoulder or recess 44 of the hose fixture 12, and moving the section 18 so that its tongue 38 enters the aperture 48 of the section 20 and so that the tongue 54 of the section 20 enters the aperture 32 of the section 18.

It will be observed that the lugs 34 and 50 not only serve to guide the tongues of their respective sections into the receiving apertures, but also serve to prevent the body of the hose from interfering with such assembly. As seen in Fig. 3, the lug 50 confines the body of the hose in the portion of the section 20 between the lug 50 and the tongue 54. It will also be noted that the tongues 38 and 54 are of sufficient length that they may enter their respective receiving apertures before any clamping action takes place. The assembly of the two sections is therefore easily and quickly made and no tools are required for this operation.

With the parts in proper position, clamping pressure may now be applied to the opposite sections by any suitable means, a bench vice being well suited for this purpose. As pressure is applied, the inner faces of the sections will grip the surface of the hose and the lugs 34 and 50 will become somewhat imbedded in the surface of the hose to prevent its rotation relative to the clamp. Finally, when sufficient clamping pressure has been applied, the tongues 38 and 54 are turned back with a hammer over the web portions 53 and 37 of the respective cooperating sections of the clamp so that they abut the outer faces of the respective sections as shown in Fig. 2. The respective sections of the clamp are now securely held to the hose and cannot become loosened or separated. It will be understood that a single size of clamp of my invention may be used with several sizes of hose and that if the body portions of the clamp sections do not exactly conform in shape to the hose they may be hammered to such shape after assembling the clamp to the hose.

While the particular apparatus herein described is well adapted for carrying out the objects of the present invention, it will be understood that various other modifications, changes, substitutions and applications may be made without departing from the spirit thereof and the present invention is to be construed to include all such modifications, changes, substitutions and applications as may come within the scope of the following claims.

What I claim is new and desire to protect by Letters Patent is:

1. In a clamp including a pair of cooperable members each having a substantially rigid but deformable metallic body of generally semi-cylindrical shape for embracing opposite sides of a hose to clamp the same to a fitting, the combination of: a locking tongue projecting beyond an edge portion of said body, an aperture formed within the opposite edge portions of the body for receiving the tongue of the other member, and an inwardly projecting lug on that side of the aperture removed from said opposite edge portion of said body for guiding the tongue of the other member into said aperture and for preventing expansion of the hose into said aperture.

2. In a clamp including a pair of cooperable members each having a substantially rigid but deformable metallic body of generally semi-cylindrical shape for embracing opposite sides of a hose to clamp the latter to a fitting, the combination of: an integral locking tongue projecting from diametrically opposed longitudinal edges of said members, an aperture formed adjacent the opposite diametrically opposed longitudinal edges of each of said members for receiving the locking tongues of the opposite members, and a guide lug formed adjacent each of said apertures and struck inwardly relative to said semi-cylindrical shaped body for confining said hose within said body to prevent expansion of said hose into said aperture.

3. In a clamp including a pair of cooperable members each having a substantially rigid but deformable metallic body of generally semi-cylindrical shape adapted to abut each other for embracing opposite sides of a hose to clamp the latter to a fitting, the combination of: integral locking tongues extending from diametrically opposed abutting edges of each of said members, stirrups offset outwardly of the body on the opposite diametrically opposed abutting edges of said members, and lugs struck inwardly of the body adjacent the stirrups and parallel with respect to the line of extension of the locking tongues to form passageways between said stirrups and said lugs for receiving said locking tongues and to confine said hose within said body to prevent expansion of said hose into said passageways.

ALBERT P. CRAIG.